July 7, 1942.    W. BLACK ET AL    2,289,094
HYDRAULIC TORQUE CONVERTER
Filed June 23, 1941

Inventors:
Willy Black,
Walter Lenz,
by Harry E. Dunham
Their Attorney.

Patented July 7, 1942

2,289,094

UNITED STATES PATENT OFFICE 2,289,094

HYDRAULIC TORQUE CONVERTER

Willy Black, Berlin-Halensee, and Walter Lenz, Berlin-Reinickendorf, Germany, assignors to General Electric Company, a corporation of New York Application June 23, 1941, Serial No. 399,374
In Germany April 23, 1940

1 Claim. (Cl. 188—151)

Our invention relates to hydraulic torque converters of the Föttinger type and more particularly to a brake mechanism for braking the rotatable guide diaphragm in such torque converters.

One object of our invention is to provide an improved brake mechanism.

For a better understanding of our invention, together with other and further objects thereof, reference is had to the following description taken in connection with the accompanying drawing, and its scope will be pointed out in the appended claim.

Figure 1:
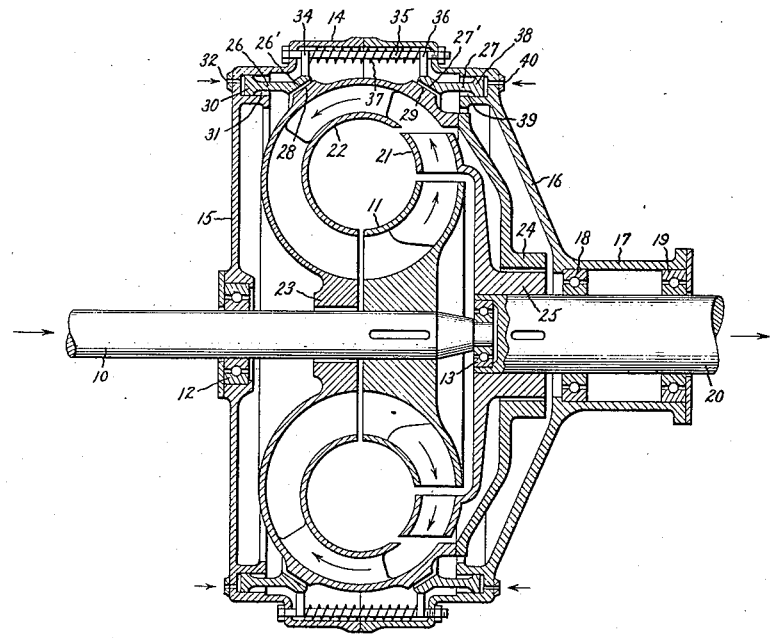
Figure 2:
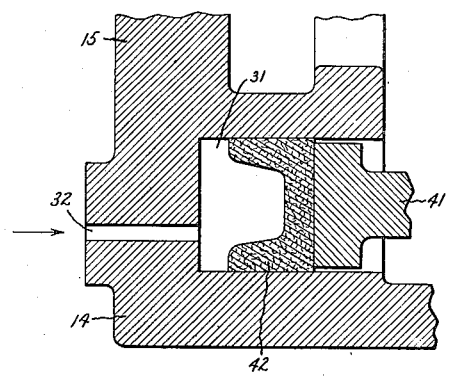

Referring to the drawing, Fig. 1 is a cross sectional elevation illustrating a Föttinger type torque converter provided with an improved brake mechanism built in accordance with our invention; Fig. 2 is an enlarged fragmentary cross sectional view of a modification of the brake operating mechanism.

Referring to Fig. 1 in detail, the cross sectional view taken through the center of the converter illustrates a drive shaft 10 having thereon a pump wheel 11 and mounted in roller bearing 12 and roller bearing 13. The torque converter is provided with a casing 14 having a wall 15 at one end in which the roller bearing 12 for the drive shaft is mounted, and a wall 16 at the other end having a sleeve 17 in which roller bearings 18 and 19 are mounted for a driven shaft 20. The driven shaft has mounted thereon a turbo wheel 21 and supports the roller bearing 13 in its end surface. A guide wheel 22 is arranged to cooperate with the pump wheel 11 and the turbo wheel 21, and is arranged to rotate about the drive shaft 10 upon a bearing sleeve 23 and upon a bearing sleeve 24 rotatable about the hub 25 of the turbo wheel 21.

The guide wheel 22 is so called because it is provided with blades which guide the power transmitting fluid from the discharge side of the turbine wheel to the intake side of the pump wheel. It is designed to rotate freely during low torque transmission and is arranged to be held stationary during high torque transmission such as occurs during starting periods of a vehicle, for example. In order to stop the rotation of the guide wheel 22, we provide in accordance with our invention two braking rings 26 and 27.

The braking rings 26 and 27 are provided with conical surfaces 26' and 27' respectively which cooperate with similar conical surfaces 28 and 29 upon the periphery of the guide wheel 22. The rings 26 and 27 are oppositely arranged so that the axial force exerted by one is balanced by the axial force exerted by the other. Ring 26 is hydraulically operated by a piston 30. This piston is preferably in the form of a flange on the ring 26 and is designed to move axially in a groove 31 in the side of the casing 14. One or more conduits 32 are provided in the side of the groove to which fluid under pressure is led in any convenient manner, not shown. When fluid enters through the conduits 32 into the groove 31, the piston 30 is moved outwardly thereby moving the conical ring surface 26 against the cooperating conical surface 28 upon the guide wheel 22 thereby exerting friction and eventually stopping the rotation of the guide wheel. The ring 26 is further provided with lugs 34 which project radially from the forward end of the ring 26 and engage bolts 35 projecting through the casing 14 to hold the two halves of the casing together. The ring 27 is similarly provided with lugs 36. The lugs 34 and 36 are preferably bifurcated at their ends to engage the bolts 35 and hold the rings against turning. A spring 37 is wound about each bolt 35 and is placed under compression between the lugs 34 and 36 of the two rings thereby exerting a force to release the braking action. The pressure of the springs overcomes the pressure of the liquid and moves the brake rings into initial position when the liquid pressure in the grooves is relieved. The ring 27 is provided with an operating piston 38 similar to piston 30 and mounted in a groove 39. The groove 39 is on the side of the casing 14 opposite to the side in which the groove 31 is provided, and conduits 40 are provided for conducting fluid into the groove to press the piston outwardly when it is desired to apply the brake. The fluid directed through the conduits 32 and 40 may be directed from any common source and will thereby exert equal pressure upon the two braking rings 26 and 27. These two pressures, being opposed, neutralize each other axially and substantially no resultant axial pressure is applied to the guide wheel 22.

There is considerable advantage in the application of our improved brake to hydraulic converters of the type described. The continuous groove on each side of the casing provides for an equal application of pressure to all points of the brake rings. By reason of their arrangement opposite to each other and the provision of liquid under the same pressure, substantially no axial pressure is exerted upon the guide wheel. Furthermore, a substantially uniform pressure is applied over the whole circumference of the brake and thereby an efficient large surface brake is obtained.

In Fig. 2 an enlarged fragment of the casing 14 is shown in cross section. This fragment is a portion of the wall 15, groove 31 and inlet conduit 32. The piston 41 herein shown is of smaller dimension than the groove 31 and is freely movable in the groove. The piston is in this case actuated not directly by the fluid but by an auxiliary packing ring 42. This packing ring is made up of a suitable flexible packing material and is given a U-shaped cross section, the sides of which tightly engage the sides of the groove 31 to prevent the escape of fluid. Fluid entering along the conduit 32 therefore exerts its full pressure upon the packing ring 42 and moves this packing ring together with the piston 41 to apply the brake ring 26. When this pressure is relieved, the spring 37 upon the bolt 35 moves the piston 41 and the packing ring 42 into initial position. The advantage of this arrangement is that a less accurate machining is necessary for the ring piston 41 than is necessary in the case of the pistons 30 and 38 and a fluid-tight fit is easibly obtained by the packing ring.

What we claim as new and desire to secure by Letters Patent of the United States, is:

In a hydraulic coupling, the combination of a stationary casing, a rotating wheel therein provided with conical brake surfaces on opposite sides thereof, grooves in the sides of said casing opposite to the sides of said wheel, rings in said grooves provided with conical surfaces arranged to cooperate with the conical surfaces on said wheel, and means for applying equal and uniform axial pressure upon said rings in said grooves to effect a braking of said wheel.

WILLY BLACK.
WALTER LENZ.